(12) United States Patent
Toda et al.

(10) Patent No.: US 6,957,633 B2
(45) Date of Patent: Oct. 25, 2005

(54) CARBURETOR FOR TWO-CYCLE ENGINE

(75) Inventors: Mamoru Toda, Iwate-ken (JP); Satoru Araki, Zama (JP)

(73) Assignee: Zama Japan (JP)

( * ) Notice: Subject to any disclaimer, the term of this patent is extended or adjusted under 35 U.S.C. 154(b) by 0 days.

(21) Appl. No.: 10/915,639

(22) Filed: Aug. 9, 2004

(65) Prior Publication Data

US 2005/0034689 A1 Feb. 17, 2005

(30) Foreign Application Priority Data

Aug. 11, 2003 (JP) ........................................ 2003-291159

(51) Int. Cl.7 ................................................ F02M 1/02
(52) U.S. Cl. .................. 123/65 R; 123/179.18
(58) Field of Search .......................... 123/65 R, 179.18, 123/73 PP, 73 R; 261/23.2, 23.3, 35, 45

(56) References Cited

U.S. PATENT DOCUMENTS

| | | |
|---|---|---|
| 968,200 A | 8/1910 | Scott |
| 2,317,772 A | 4/1943 | Huber et al. |
| 2,981,279 A | 4/1961 | Beck |
| 3,439,658 A | 4/1969 | Simonet |
| 3,882,831 A | 5/1975 | Date et al. |
| 3,982,507 A | 9/1976 | Asaka et al. |
| 4,060,062 A | 11/1977 | Tsutsui et al. |
| 4,067,302 A | 1/1978 | Ehrlich |
| 4,075,985 A | 2/1978 | Iwai |
| 4,094,931 A | 6/1978 | Karino |
| 4,176,631 A | 12/1979 | Kanao |
| 4,216,747 A | 8/1980 | Noguchi et al. |
| 4,248,183 A | 2/1981 | Noguchi et al. |
| 4,248,185 A | 2/1981 | Jaulmes |
| 4,256,063 A | 3/1981 | Sumiyoshi et al. |
| 4,294,205 A | 10/1981 | Iiyama et al. |
| 4,333,429 A | 6/1982 | Iiyama et al. |
| 4,414,939 A | 11/1983 | Jahoda |
| 4,481,910 A | 11/1984 | Sheaffer |
| 4,861,522 A | 8/1989 | Gerhardy et al. |
| 4,903,655 A | 2/1990 | Vonderau et al. |
| 4,936,267 A | 6/1990 | Gerhardy et al. |
| 4,944,272 A | 7/1990 | Carlsson et al. |
| 4,969,425 A | 11/1990 | Slee |
| 4,995,349 A | 2/1991 | Tuckey |
| 5,200,118 A | 4/1993 | Hermle |
| 5,283,013 A | 2/1994 | Gerhardy |
| 5,379,732 A | 1/1995 | Mavinahally et al. |
| 5,681,508 A | 10/1997 | Gerhardy |
| 5,743,240 A | 4/1998 | Zerrer et al. |
| 6,000,683 A | 12/1999 | Van Allen |

(Continued)

FOREIGN PATENT DOCUMENTS

| | | |
|---|---|---|
| EP | 0 933 514 A1 | 4/1999 |
| EP | 0 971 110 A1 | 12/2002 |
| JP | 9-125966 | 5/1997 |
| JP | 2000-314350 | 11/2000 |
| JP | 2004-176634 | 6/2004 |
| WO | WO 01/51782 A1 | 7/2001 |

Primary Examiner—Henry C. Yuen
Assistant Examiner—Hyder Ali
(74) Attorney, Agent, or Firm—Orrick, Herrington & Sutcliffe LLP

(57) ABSTRACT

An interlocking lever having first and second cam faces is mounted on a throttle valve stem, and a throttle valve is arbitrarily opened to perform start-up in a state in which the first cam face makes contact with the choke valve lever and the interlocking lever is stopped during low-temperature start-up with the choke valve closed. After the choke valve has been returned to the fully open position, the throttle valve alone is opened with a small degree of opening to perform low-load operation; and in the mid- and high-load region, the interlocking lever integrally turns with the throttle valve, the second cam face pushes the air valve lever, and the throttle valve and air valve are caused to open and close proportionally.

20 Claims, 6 Drawing Sheets

U.S. PATENT DOCUMENTS

| | | | |
|---|---|---|---|
| 6,085,703 A | 7/2000 | Noguchi | |
| 6,112,708 A | 9/2000 | Sawada et al. | |
| 6,123,322 A | 9/2000 | Sasaki | |
| 6,152,093 A | 11/2000 | Sawada et al. | |
| 6,202,989 B1 | 3/2001 | Pattullo | |
| 6,216,650 B1 | 4/2001 | Noguchi | |
| 6,240,886 B1 | 6/2001 | Noguchi | |
| 6,257,181 B1 | 7/2001 | Rosskamp et al. | |
| 6,267,088 B1 | 7/2001 | Rosskamp et al. | |
| 6,289,856 B1 | 9/2001 | Noguchi | |
| 6,298,811 B1 | 10/2001 | Sawada et al. | |
| 6,328,288 B1 | 12/2001 | Gerhardy | |
| 6,334,606 B1 | 1/2002 | Tobinai et al. | |
| 6,347,787 B1 | 2/2002 | Tobinai et al. | |
| 6,349,925 B1 | 2/2002 | Tobinai et al. | |
| 6,352,058 B1 | 3/2002 | Yuasa et al. | |
| 6,354,251 B1 | 3/2002 | Toda | |
| 6,708,958 B1 | 3/2004 | Warfel et al. | |
| 6,877,723 B2 * | 4/2005 | Martinsson et al. | 261/23.3 |
| 2004/0130039 A1 | 7/2004 | Suzuki et al. | |

* cited by examiner

CARBURETOR FOR TWO-CYCLE ENGINE

FIELD OF THE INVENTION

The present invention relates to carburetor for supplying fuel to a two-stroke engine in which scavenging air is introduced to the fuel chamber prior to an air/fuel mixture.

BACKGROUND OF THE INVENTION

Widely known are two-stroke engines in which scavenging air is introduced to the combustion chamber during the downward stroke of the piston, and an air/fuel mixture is introduced to the combustion chamber after exhausting combustion gas. These methods of introduction include feeding scavenging air to a scavenging channel connected to the crankcase and the fuel chamber and also feeding an air/fuel mixture to the crankcase. Alternatively, scavenger air is introduced to the fuel chamber and an air/fuel mixture is introduced to the crankcase to introduce scavenging air to the fuel chamber in the order described above.

The flow rate of scavenging air and the air/fuel mixture must be made proportional in order to prevent incomplete combustion, stabilize engine operation, and so forth. An air valve is therefore provided to the air channel for supplying scavenging air to the engine. The air valve is operated in coordination with the throttle valve of the carburetor. In this case, when the valves are butterfly throttle valves, the air valve is also a butterfly valve, and it is common to link these with a widely-known link mechanism, as cited in Japanese Patent Application Laid-open Nos. 9-125966 and 2000-314350 and International Patent Application WO01/51782A1, for example.

When the carburetor is provided with a choke valve, start-up is adequately performed by causing high negative pressure to act on the main nozzle in a condition in which the choke valve is closed and the throttle valve is opened slightly at low temperatures. At this time, the air valve must be closed. When a link mechanism (refer to Japanese Patent Application Laid-open No. 2000-314350) configured so that the air valve is opened after the throttle valve has been opened to a certain degree is used in order to achieve this goal or to prevent the air/fuel mixture from becoming thin during low loads, a drawback tends to arise in that the operator cannot determine the point in time at which the air valve begins to open, so the throttle valve is allowed to open until the air valve opens, making it impossible to obtain a high density air/fuel mixture required for start-up at low temperatures.

As a countermeasure, it is possible to consider interlocking a throttle valve and a choke valve with a link mechanism, and opening the throttle valve in a range in which the air valve does not open when the choke valve is closed. However, there is a drawback when this countermeasure is adopted in that two mutually independent link mechanisms are used, the configuration becomes complex, the number of components greatly increases, and a fairly large installation space must be set aside when mounting the structure on an engine.

SUMMARY OF THE INVENTION

The present invention was developed to solve the above-described drawback of not having a simple interlocking mechanism in which the throttle valve can open without causing the air valve to open when the choke valve is closed in a carburetor for a two-stroke engine in which the air valve is interlocked with the throttle valve. Accordingly, an object of the present invention is to provide a carburetor for a two-stroke engine that has an interlocking mechanism in which proper opening and closing action can be carried out with a simple configuration and a small number of components.

The present invention is configured as follows in order to solve the above-described problems in a carburetor for a two-stroke engine having an air intake passage that accommodates a throttle valve and a choke valve and feeds an air/fuel mixture to the engine, and an air channel that accommodates an air valve and feeds scavenger air to the engine. In one embodiment according to the present invention, the throttle valve is configured so that an interlocking lever having a first and second cam surface is independently rotatably mounted on the throttle valve with or without following the opening and closing action of the throttle valve. The choke valve is configured so that a valve-opening spring is fixedly mounted on the choke valve stem to provide a valve-opening force for urging the choke valve and the choke valve lever in contact with the first cam face. The air valve is configured so that a valve-closing spring is fixedly mounted on the air valve stem to provide a valve-closing force for urging the air valve and the air valve lever in contact with the second cam face. The choke valve lever is placed in the region beyond the turning of the interlocking lever in a state in which the choke valve is open, but is brought into contact with the first cam face, restrains the interlocking lever at a position in which the second cam face does not make contact with the air valve lever, and brings the air valve into a closed state when the choke valve is in a closed state. Also, the interlocking lever is configured so that when the restraint by the choke valve lever is released, the second cam face makes contact with the air valve lever at or above a certain degree of opening of the throttle valve to cause the air valve to open in accordance with the opening of the throttle valve.

More particularly, the interlocking lever is set in a position in which the air valve is held in a closed state by the choke valve lever when the choke valve is closed, and the throttle valve alone is allowed to be fully open. Also, the first cam face is formed so that the choke valve lever causes the interlocking lever to stop at a position at which the second cam face does not make contact with the air valve lever between the fully closed position of the choke valve and a position corresponding to a certain degree of opening.

When starting up an engine at low temperatures with a carburetor with the above-described configuration, normally the choke valve is caused to close in a state in which the throttle valve and the air valve are closed and the choke valve is open. Next, when the throttle valve is opened in order to secure start-up fuel, the interlocking lever that turns with the opening of the valve is stopped when the first cam face makes contact with the choke valve lever, the throttle valve alone turns thereafter and is opened to the fully open position, and the air valve is held in the closed position. The operator can thereby adopt an operation method whereby the throttle valve is fully opened to perform cranking in order to ensure start-up at low temperatures.

When the engine has completed firing up, the throttle valve is normally returned to the idle position, and the choke valve is operated so as to gradually open or to fully open in a single action. Usual actions are carried out in the sense that after warm-up is completed the interlocking lever integrally turns with the throttle valve without interference from the choke valve lever, the throttle valve is open while the air valve remains closed in the low-load region, and the air valve opens in coordination with the throttle valve in the mid- and high-load regions.

It is preferable to properly carry out the above-described action in a configuration in which the throttle valve stem fixedly supports a throttle valve lever and rotatably supports an interlocking lever, and a return spring for urging the throttle valve with a valve-closing force is provided so as to be latched at both ends to the throttle valve lever and the interlocking lever.

In another embodiment according to the present invention, the throttle valve is configured so that a return spring is fixedly mounted to the throttle valve stem to provide valve-closing force for urging the throttle valve and the interlocking lever having a contact face and a cam face. The choke valve is configures so that a valve-opening spring is fixedly mounted on the choke valve stem to provide a valve-opening force for urging the choke valve and the choke valve lever in contact with the contact face of the interlocking lever. The air valve is configured so that a valve-closing spring is fixedly mounted on the air valve stem to provide a valve-closing force for urging the air valve and the air valve lever in contact with the cam face. The choke valve lever is placed in the region beyond the turning of the interlocking lever in a state in which the choke valve is open, but is brought into contact with the contact face, limits the rotation of the interlocking lever in a position at or below the position in which the cam is kept in contact with the air valve lever, and keeps the air valve in a closed state when the choke valve is in a closed state. Also, the interlocking lever is configured so that when the limitation of the choke valve lever is released, the cam face makes contact with the air valve lever at or above a certain degree of opening of the throttle valve to cause the air valve to open in accordance with the opening of the throttle valve.

When an engine is started up at low temperatures with a carburetor configured as described above, the air valve is kept in the closed position and the throttle valve is opened to within a certain degree if the choke valve is closed. Because of this, the throttle valve cannot be fully opened to perform cranking, but start-up at low temperatures can be reliably carried out with a normal operational method in which the throttle valve is slightly opened to secure start-up fuel. The same as that described above is employed for opening the choke valve, then opening the throttle valve while keeping the air valve closed in the low-load region, and interlocking the throttle valve and opening the air valve in the mid- or high-load region.

According to the present invention, a simple interlocking mechanism that has a minimum number of components that is provided with an interlocking lever, a choke valve lever, an air valve lever, and springs mounted on these levers can be used to perform start-up at low temperatures by closing the choke valve and the air valve and suitably opening the throttle valve, to open the throttle valve with the air valve remaining closed in a low-load region, and to open the air valve in interlocked fashion with the throttle valve in the mid- or high-load region.

DETAILED DESCRIPTION OF THE PREFERRED EMBODIMENTS

Figure 1:
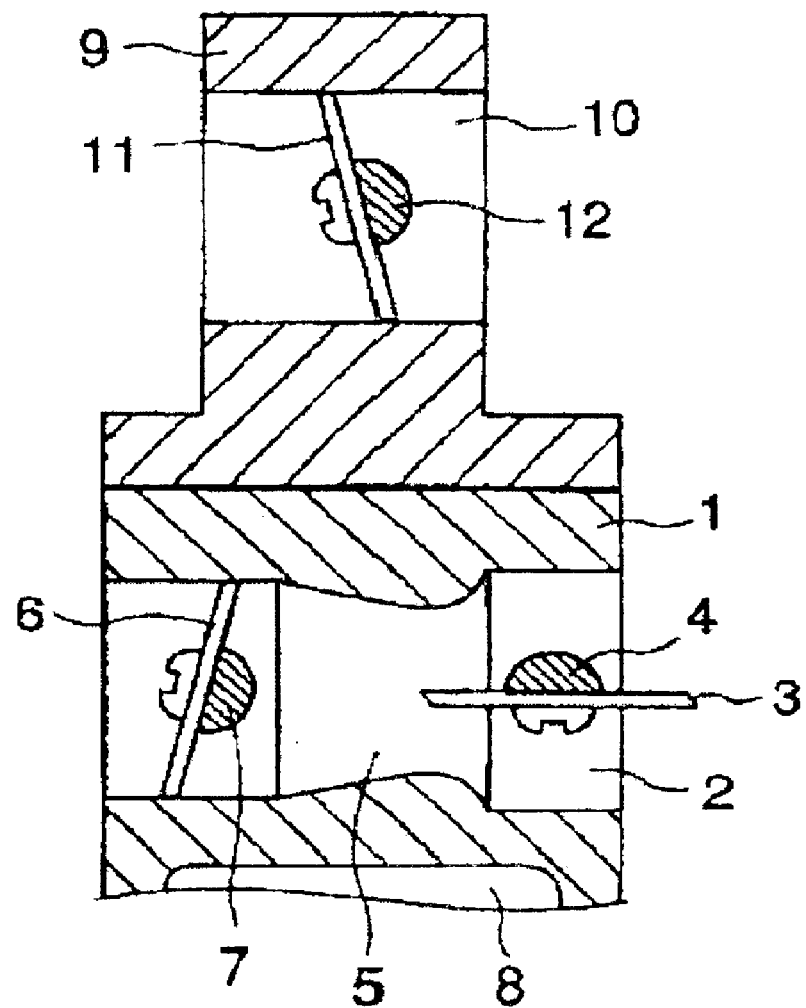
FIG. 1 is a longitudinal sectional schematic diagram of the carburetor to which the present invention is applied.

Embodiments of the present invention are described below with reference to the drawings. FIG. 1 is a longitudinal sectional schematic diagram of the carburetor to which the present invention is applied, wherein a body 9 is overlaid and affixed to the upper face of a carburetor 1. The carburetor 1 has an air intake passage 2 that extends in the lateral direction for feeding an air/fuel mixture to the engine, and a diaphragm type constant fuel chamber 8 formed on the lower face. The air intake passage 2 has, in order from the inlet to the outlet, a choke valve 3, a venturi 5, and a throttle valve 6. The fuel in the constant fuel chamber 8 passes through the main fuel channel leading to the main nozzle (not depicted) open to the venturi 5, and through the low-speed fuel channel leading to the idle and slow ports (not depicted) open to the rear of the throttle valve 6, to be delivered to the air intake passage 2.

The body 9 has an air channel 10 that extends in the lateral direction for feeding scavenger air to the engine, and an air valve 11 is disposed in the air channel 10. The choke valve 3, throttle valve 6, and air valve 11 are all butterfly valves, and the choke valve stem 4, throttle valve stem 7, and air valve stem 12 of these protrude to the side face on the same side of the carburetor 1 and body 9.

Figure 2:
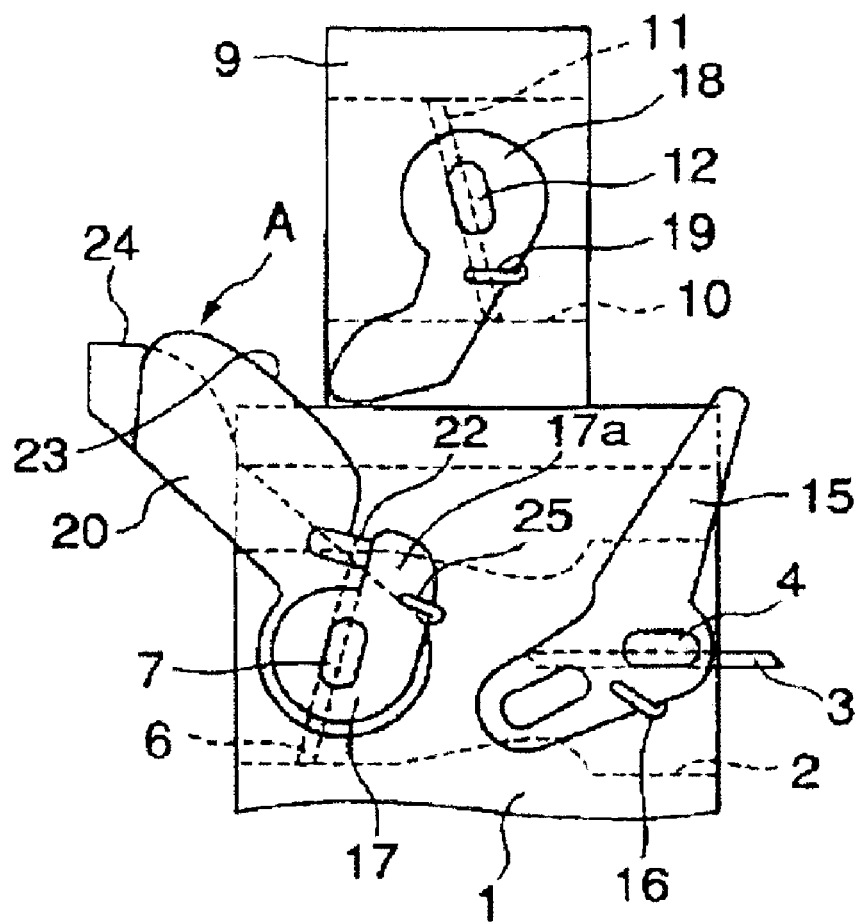
FIG. 2 is a front view showing an embodiment of the present invention.
Figure 3:
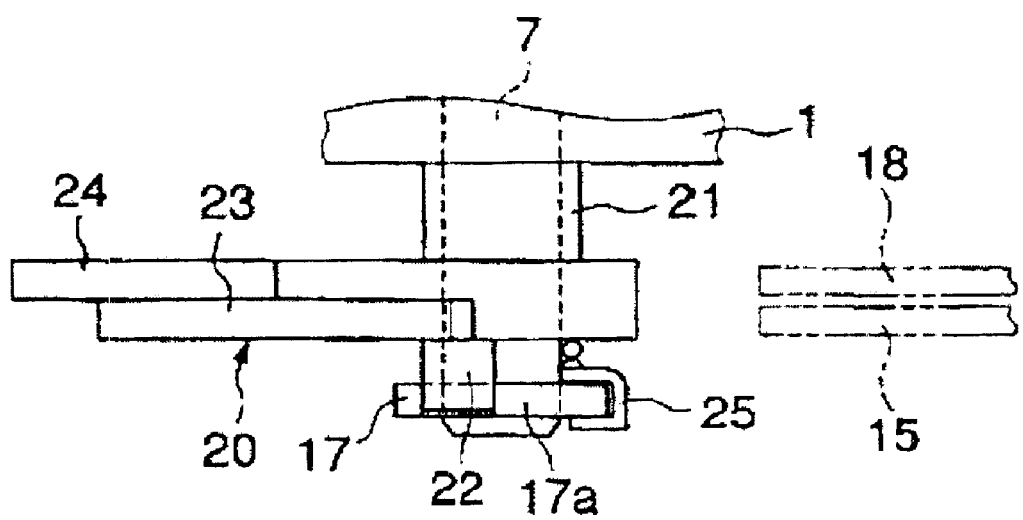
FIG. 3 is an enlarged partial diagram viewed in the direction of arrow A in FIG. 2.

Referring to FIGS. 2 and 3, a choke valve lever 15, a throttle valve lever 17, and an air valve lever 18 are fixedly mounted to the protruding ends of the choke valve stem 4, throttle valve stem 7, and air valve stem 12. The choke valve 3 is urged in the valve opening direction by a force produced by a valve opening spring 16 composed of a torsion spring which is mounted around the choke valve stem 4 and both ends of which are latched to the carburetor main body 1 and the choke valve lever 15. The air valve 11 is urged in the valve closing direction by a force produced by a valve closing spring 19 composed of a torsion spring which is mounted around the air valve stem 12 and both ends of which are latched to the body 9 and the air valve lever 18.

An interlocking lever 20 is rotatably mounted to the protruding end portion of the throttle valve stem 7. This interlocking lever 20 has a boss 21 fitted to the throttle valve stem 7 at the base end portion, and a protruding stopper 22 that is in contact with the receiving edge 17a provided on the throttle lever 17. A first cam face 23 and a second cam face 24 are formed adjacent to each other in a stepwise manner along the end edge that faces the choke valve lever 15 and the air valve lever 18. The choke valve lever 15 and the first cam face 23 are disposed in the same plane and turn in this plane; the air valve lever 18 and the second cam face 24 are disposed in another same plane and turn in this plane. The choke valve lever 15 and the air valve lever 18 turn without one interfering with the other. The installation position of the air valve 11 can be arbitrarily moved with respect to the throttle valve 6 and choke valve 3.

Furthermore, the throttle valve 6 is urged in the valve closing direction by a force produced by a return spring 25 composed of a torsion spring which is mounted around the throttle valve stem 7 and both ends of which are latched to the throttle valve lever 17 and the interlocking lever 20.

An accelerator lever is mounted on the opposite end of the throttle valve stem 7, and the throttle valve 6 is opened when the operator applies an accelerator action to the accelerator lever. Also, the choke valve 3 is configured to close when the operator applies a choke action to the choke valve lever 15. FIGS. 1 and 2 show a situation in which the choke valve 3 is set in the fully open position, the throttle valve 6 is set in the idle position, the air valve 11 is set in the fully closed position, and the engine is stopped or idling. The interlocking lever 20 is stopped by the return spring 25 pressing the stopper 22 against the receiving edge 17a of the throttle lever 17 in the idle position, whereby the choke valve lever 15 and the first cam face 23 are separated from each other, as are the air valve lever 18 and the second cam face 24.

Figure 4:
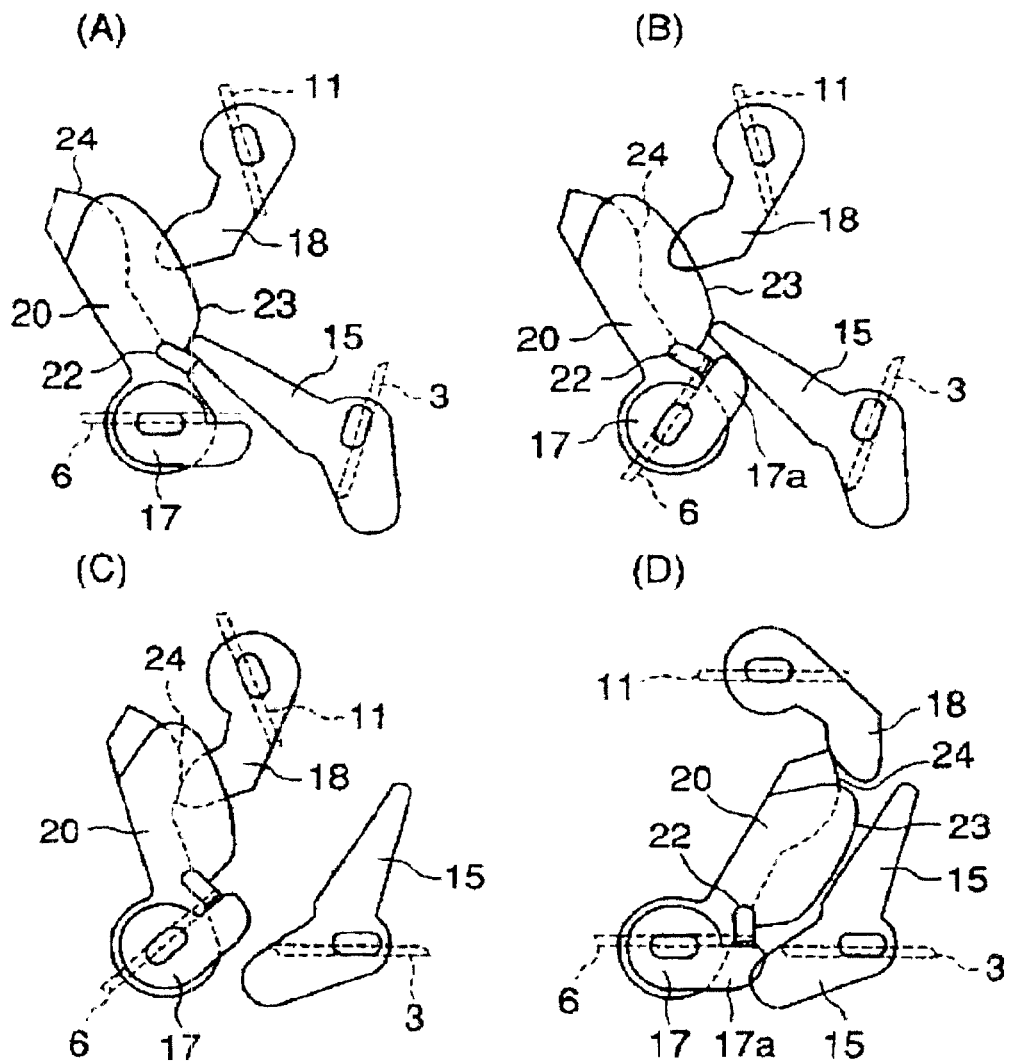
FIG. 4 is an operation schematic diagram of the embodiment shown in FIG. 2.

When the choke valve 3 is fully closed in order to start the engine at low temperatures, the choke valve lever 15 is positioned as shown in FIG. 4(A). When the throttle valve 6 is in the idle position, the first cam face 23 is separated from the choke valve lever 15, but when the throttle valve 6 is opened in order to ensure start-up fuel, the first cam face 23 makes contact with the choke valve lever 15 the moment the throttle valve is slightly opened. The choke valve lever 15 thereafter serves as a stopper, and the throttle valve 6 is opened with the interlocking lever 20 left in a stopped condition. Because the air valve 11 is stopped in a position in which the second cam face 24 is separated from the air valve lever 18, the fully closed position is maintained. FIG. 4(A) shows the state in which the throttle valve 6 is fully open, and this configuration has advantages in that start-up can be performed with the throttle valve 6 at any degree of opening between a position slightly open from the idling position to a fully open position, and the degree of freedom in throttle valve operation during start-up at low temperatures is the largest.

When the engine has completed firing up, the throttle valve 6 is normally returned to the idle position, and the choke valve 3 is gradually opened or is fully opened in a single action. In this case, when the choke valve 3 is set to a slightly open position and the throttle valve 6 is opened from the idle position, the interlocking lever 20 stops at a position in which the first cam face 23 is in contact with the choke valve lever 15. For this reason, the throttle valve 6 can be arbitrarily opened while keeping the air valve 11 in the closed position to perform stable warm-up operation. An unloader function can furthermore be imparted by opening and holding the choke valve 3 within a region in which the degree of opening is such that the interlocking lever 20 is stopped in a range in which the second cam face 24 does not make contact with the air valve lever 18. FIG. 4(B) shows one of such states, and the throttle valve 6 is opened slightly further than in the idle position.

In the present embodiment, in order to properly perform the above-described operation, the first cam face 23 is formed so that the choke valve lever 15 stops the interlocking lever 20 at a position at which the second cam face 24 does not make contact with the air valve lever 18 between the fully closed position of the choke valve 3 and position corresponding to a certain degree of opening.

The choke valve 3 is fully opened when warm-up is completed, and the return spring 25 causes the interlocking lever 20 to integrally turn with the throttle valve 6. In a low-load region in which the degree of opening of the throttle valve 6 is small, the air valve 11 is not caused to open by the second cam face 24 coming into contact with the air valve lever 18, so situations can be prevented in which an air/fuel mixture alone from the air intake passage 2 is fed to the engine, the air/fuel mixture created with fuel from primarily the low-speed system is made thinner, and the engine performs poorly. When the throttle valve 6 is opened to a considerable extent, the second cam face 24 causes the air valve lever 18 to turn and open the air valve 11. These states pass through a mid-load region shown in the half-open state in FIG. 4(C) and arrive at a high-load region shown in the fully open state in FIG. 4(D).

The degrees of opening of the throttle valve 6 and the air valve 11 are substantially proportional, and the flow rates of the air/fuel mixture and the scavenger air fed to the engine are therefore substantially proportional, but the ratio at which the flow rate of the scavenger air varies with respect to the air/fuel mixture can be arbitrarily set by the shape of the second cam face 24.

Figure 5:
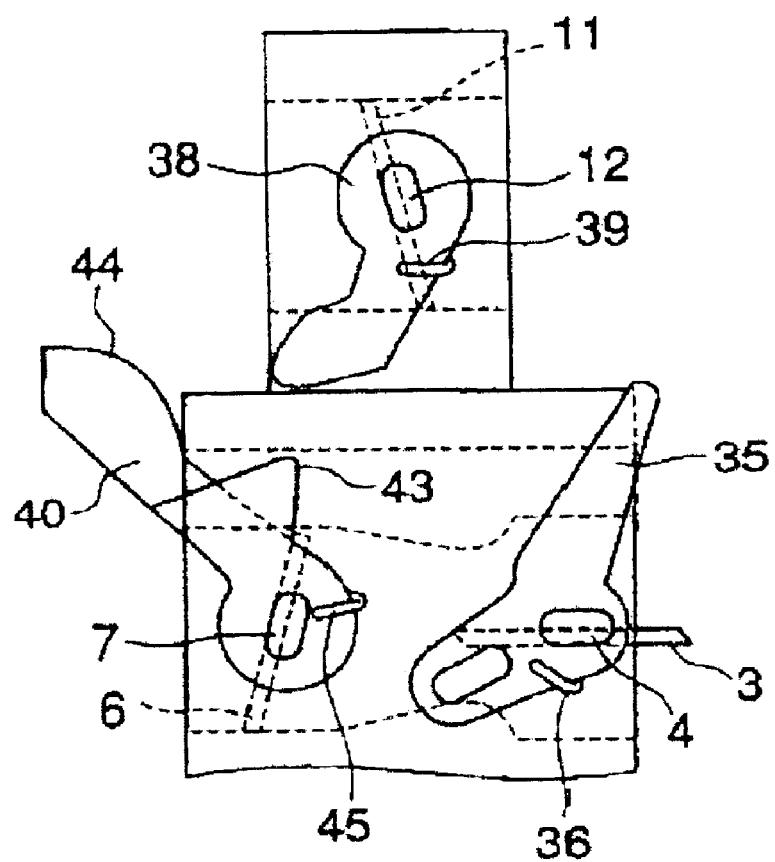
FIG. 5 is a front view showing another embodiment of the present invention.

FIG. 5 shows another embodiment of the present invention in which a choke valve lever 35, an interlocking lever 40, and an air valve lever 38 are fixedly mounted to the protruding ends of the choke valve stem 4, throttle valve stem 7, and air valve stem 12. The choke valve 3 is urged in the valve opening direction by a force produced by the same valve opening spring 36 as the above-described embodiment. The throttle valve 6 is urged in the valve closing direction by a force produced by a return spring 45 composed of a torsion spring which is mounted around the throttle valve stem 7 and both ends of which are latched to the carburetor main body 1 and the interlocking lever 40. The air valve 11 is urged in the valve closing direction by a force produced by the same valve closing spring 39 as the above-described embodiment The interlocking lever 40 has a contact face 43 and a cam face 44 which are formed adjacent to each other in a stepwise manner along the end edge that faces the choke valve lever 35 and the air valve lever 38. The choke valve lever 35 and the contact face 43 are disposed in the same plane and turn in this plane. The air valve lever 38 and the cam face 44 are disposed in another same plane and turn in this plane.

FIG. 5 shows a situation in which the choke valve 3 is set in the fully open position, the throttle valve 6 is set in the idle position, the air valve 11 is set in the fully closed position, the engine is stopped or idling, and the choke valve lever 35 and the contact face 43 are separated from each other, as are the air valve lever 38 and the cam face 44.

Figure 6:
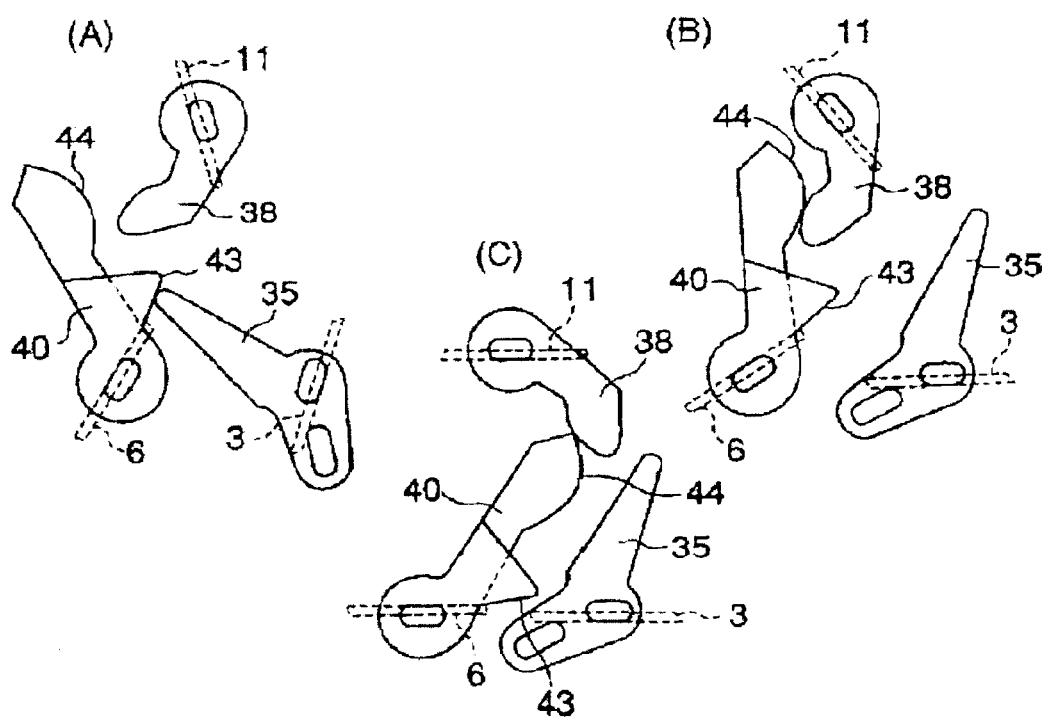
FIG. 6 is an operation schematic diagram of the embodiment shown in FIG. 5.

When the choke valve 3 is fully closed in order to start the engine at low temperatures, the choke valve lever 35 is positioned as shown in FIG. 6(A). When the throttle valve 6 is in the idle position, the contact face 43 is separated from the choke valve lever 35. When the throttle valve 6 is opened in order to ensure start-up fuel, the contact face 43 makes contact with the choke valve lever 35 when the throttle valve is slightly open, and the throttle valve 6 is not opened further. On the other hand, the cam face 44 is separated from the air valve lever 38, and the air valve 11 is kept in the fully closed position. FIG. 6(A) shows the state at this time, and start-up can be performed with the throttle valve 6 at any degree of opening between the idling position and the position shown in the diagram, but start-up is commonly performed at the position corresponding to the degree of opening shown in the diagram. According to the present embodiment, the degree of freedom in throttle valve operation during low-temperature start-up is small, but an operator who adopts an operating method in which the engine is started with a slightly opened throttle valve 6 can be provided with a sense of confidence that the opening can always be kept constant.

When the engine has completed firing up and the choke valve 3 is opened, the choke valve lever 35 disengages from the contact face 43 the moment the valve is slightly opened from the completely closed state. The choke valve 3 thereafter gradually or abruptly opens. Unrelated to this action, the throttle valve 6 can be opened and closed, and warm-up operation performed, in a range in which the cam face 44 is not allowed contact with the air valve lever 38. Therefore, in the present embodiment, the contact face 43 is formed so that contact is made with the choke valve lever 35 between the fully closed position of the choke valve 3 and a position slightly open from this state, and contact is not made at positions opened to a greater extent.

After the choke valve 3 has returned to the fully opened position when warm-up is completed, the cam face 44 keeps the air valve in the closed position without making contact with the air valve lever 38 in the low-load region in which the throttle valve 6 has a small degree of opening, but as the throttle valve 6 is opened to a considerable extent, the cam face 44 of the integrally turning interlocking lever 40 causes the air valve lever 38 to turn and open the air valve 11. These states pass through the mid-load region shown in the half-open state in FIG. 6(B) and arrive at the high-load region shown in the fully open state in FIG. 6(C). The relationship between degrees of opening of the throttle valve 6 and the air valve 11, in other words, the ratio at which the flow rate of the scavenger air varies with respect to the air/fuel mixture in the present embodiment, can be arbitrarily set by the shape of the cam face 44 in the same manner as the above-described embodiment.

What is claimed is:

1. A carburetor for a two-stroke engine having an air intake passage that accommodates a throttle valve and a choke valve and feeds an air/fuel mixture to the engine, and an air channel that accommodates an air valve and feeds scavenger air to the engine, comprising:
    an interlocking lever that has a first and second cam surface and is rotatably mounted on a throttle valve stem and selectively restrainable from following the opening and closing action of the throttle valve;
    a valve-opening spring fixedly mounted on the choke valve stem to provide a valve-opening force for urging a choke valve and the choke valve lever in contact with the first cam face; and
    a valve-closing spring fixedly mounted on an air valve stem to provide a valve-closing force for urging the air valve and an air valve lever in contact with the second cam face, wherein
    a choke valve lever is placed in the region beyond the turning of the interlocking lever in a state in which the choke valve is open, but is brought into contact with the first cam face and restrains the interlocking lever at a position in which the second cam face does not make contact with the air valve lever, and wherein the valve-closing spring brings the air valve into a closed state when the choke valve is in a closed state, and wherein
    the interlocking lever is configured so that when the restraint by the choke valve lever is released, the second cam face makes contact with the air valve lever at or above a certain degree of opening of the throttle valve to open the air valve.

2. The carburetor for a two-stroke engine according to claim 1, wherein the interlocking lever is set in a position in which the air valve is held in a closed state by the choke valve lever when the choke valve is closed, and the throttle valve alone is allowed to be fully open.

3. The carburetor for a two-stroke engine according to claim 1, wherein the first cam face is formed so that the choke valve lever causes the interlocking lever to stop at a position at which the second cam face does not make contact with the air valve lever between the fully closed position of the choke valve and a position corresponding to a certain degree of opening.

4. The carburetor for a two-stroke engine according to claim 2, wherein the first cam face is formed so that the choke valve lever causes the interlocking lever to stop at a position at which the second cam face does not make contact with the air valve lever between the fully closed position of the choke valve and a position corresponding to a certain degree of opening.

5. The carburetor for a two-stroke engine according to claim 1, wherein the throttle valve stem fixedly supports a throttle valve lever and rotatably supports the interlocking lever, and a return spring for urging the throttle valve with a valve-closing force is provided so as to be latched at both ends to the throttle valve lever and the interlocking lever.

6. The carburetor for a two-stroke engine according to claim 2, wherein the throttle valve stem fixedly supports a throttle valve lever and rotatably supports the interlocking lever, and a return spring for urging the throttle valve with a valve-closing force is provided so as to be latched at both ends to the throttle valve lever and the interlocking lever.

7. The carburetor for a two-stroke engine according to claim 3, wherein the throttle valve stem fixedly supports a throttle valve lever and rotatably supports the interlocking lever, and a return spring for urging the throttle valve with a valve-closing force is provided so as to be latched at both ends to the throttle valve lever and the interlocking lever.

8. A carburetor for a two-stroke engine having an air intake passage that accommodates a throttle valve and a choke valve and feeds an air/fuel mixture to the engine, and an air channel that accommodates an air valve and feeds scavenger air to the engine, comprising:
    a return spring fixedly mounted to a throttle valve stem to provide valve-closing force for urging the throttle valve and an interlocking lever having a contact face and a cam face;
    a valve-opening spring fixedly mounted on the choke valve stem to provide a valve-opening force for urging a choke valve and the choke valve lever in contact with the contact face; and
    a valve-closing spring fixedly mounted on an air valve stem to provide a valve-closing force for urging the air valve and the air valve lever in contact with the cam face, wherein
    the choke valve lever is placed in the region beyond the turning of the interlocking lever in a state in which the choke valve is open, but is brought into contact with the contact face and limits the rotation of the interlocking lever in a position at or below the position in which the cam face is kept in contact with the air valve lever, and wherein the valve-closing spring keeps the air valve in a closed state when the choke valve is in a closed state, and wherein
    the interlocking lever is configured so that when the limitation imposed by the choke valve lever is released, the cam face makes contact with the air valve lever at or above a certain degree of opening of the throttle valve to cause the air valve to open in accordance with the opening of the throttle valve.

9. The carburetor for a two-stroke engine according to claim 8, wherein the contact face is formed so that contact is made with the choke valve lever between the fully closed position of the choke valve and a position slightly open from this state, and contact is not made at positions opened to a greater extent.

10. A carburetor comprising
an air intake passage,
a throttle valve located within the air intake passage, the throttle valve being mounted on a throttle valve stem
a choke valve located within the air intake passage, the choke valve being mounted on a choke valve stem,
a choke valve lever coupled to the choke valve stem,
an air channel,
an air valve located within the air channel, the air valve being mounted on an air valve stem,
an air valve lever coupled to the air valve stem, and
an interlocking lever rotatably mounted on a throttle valve stem and operably couplable to the choke valve lever and air valve lever, the interlocking lever being restrainable from following the opening rotation of the throttle valve, wherein the interlocking lever includes first and second cam surfaces, and wherein the air valve lever contacts the second cam face.

11. The carburetor of claim 10 further comprising a valve-opening spring fixedly mounted on the choke valve stem to provide a valve-opening force for urging the choke valve open.

12. The carburetor of claim 10, wherein the choke valve lever contacts the first cam face.

13. The carburetor of claim 10 further comprising a valve-closing spring fixedly mounted on the air valve stem to provide a valve-closing force for urging the air valve closed.

14. The carburetor of claim 10 wherein the choke valve lever is rotatable to a region beyond the turning of the interlocking lever in a state in which the choke valve is open.

15. The carburetor of claim 10 wherein the choke valve lever is rotatable to contact the first cam face and restrain the interlocking lever at a position in which the second cam face does not make contact with the air valve lever.

16. The carburetor of claim 15 wherein the valve-closing spring brings the air valve into a closed state when the choke valve is in a closed state.

17. The carburetor of claim 10, wherein the interlocking lever is set in a position in which the air valve is held in a closed state by the choke valve lever when the choke valve is closed, and the throttle valve alone is allowed to be fully open.

18. The carburetor of claim 10 wherein the first cam face is formed to contact the choke valve lever and stop the interlocking lever at a position at which the second cam face does not make contact with the air valve lever between the fully closed position of the choke valve and a position corresponding to a certain degree of opening.

19. The carburetor of claim 10, wherein the throttle valve stem fixedly supports a throttle valve lever and rotatably supports the interlocking lever, and a return spring for urging the throttle valve with a valve-closing force is provided so as to be latched at both ends to the throttle valve lever and the interlocking lever.

20. A carburetor comprising
an air intake passage,
a throttle valve located within the air intake passage, the throttle valve being mounted on a throttle valve stem
a choke valve located within the air intake passage, the choke valve being mounted on a choke valve stem,
a choke valve lever coupled to the choke valve stem,
an air channel,
an air valve located within the air channel, the air valve being mounted on an air valve stem,
an air valve lever coupled to the air valve stem, and
an interlocking lever rotatably mounted on a throttle valve stem and operably couplable to the choke valve lever and air valve lever, the interlocking lever being restrainable from following the opening rotation of the throttle valve, wherein the interlocking lever includes first and second cam surfaces, and wherein the choke valve lever is rotatable to contact the first cam face and restrain the interlocking lever at a position in which the second cam face does not make contact with the air valve lever, and
wherein the interlocking lever, when not restrained by the choke valve lever, is operably couplable with the air valve lever wherein the second cam face makes contact with the air valve lever at or beyond a certain degree of opening of the throttle valve to open the air valve.

* * * * *